Dec. 23, 1924.
C. V. McCARLEY
LIGHT DEFLECTOR
Filed Sept. 4, 1923
1,520,475
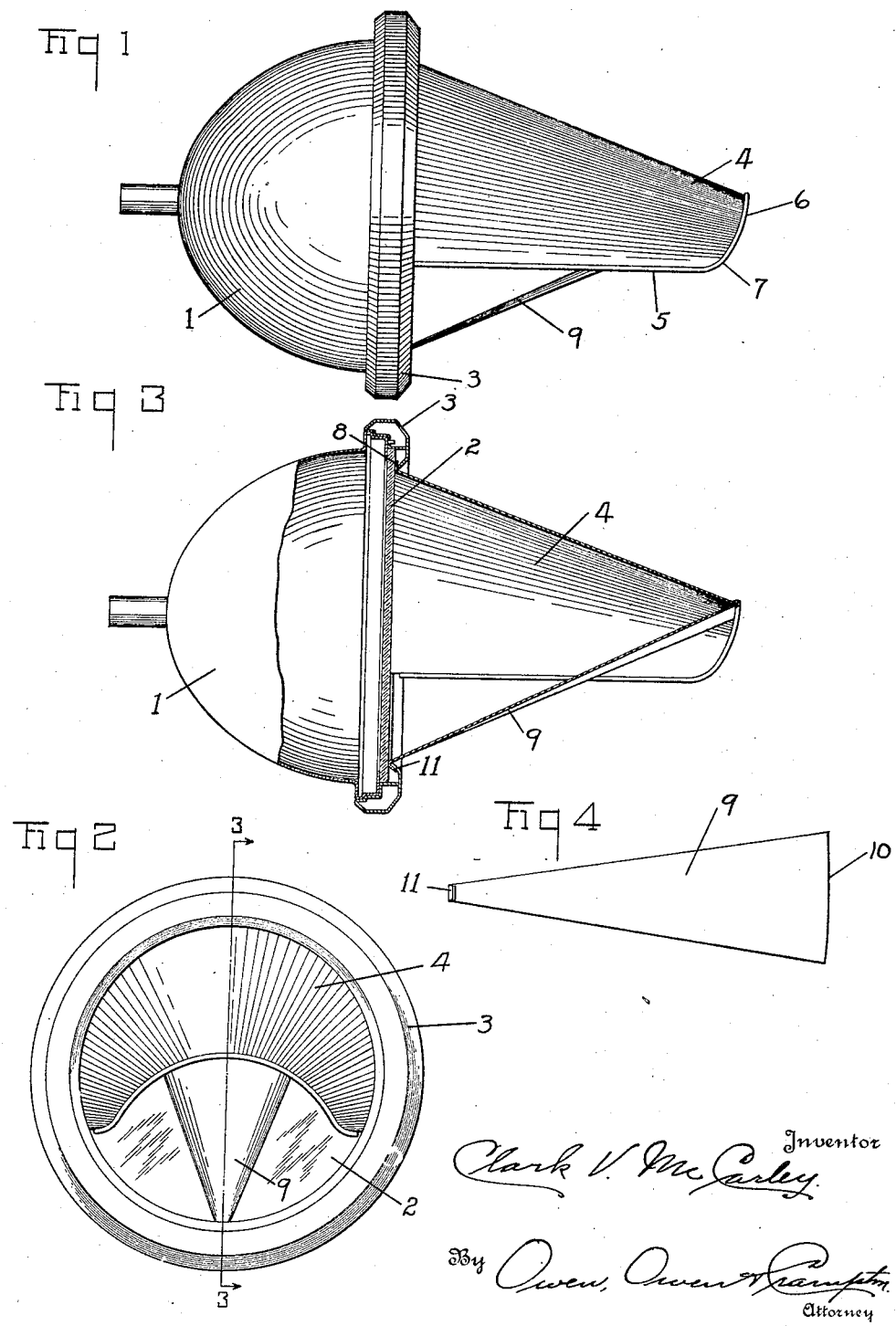

Patented Dec. 23, 1924.

1,520,475

UNITED STATES PATENT OFFICE.

CLARK V. McCARLEY, OF McCLURE, OHIO.

LIGHT DEFLECTOR.

Application filed September 4, 1923. Serial No. 660,893.

*To all whom it may concern:*

Be it known that I, CLARK V. McCARLEY, a citizen of the United States, and a resident of McClure, in the county of Henry and State of Ohio, have invented a new and useful Light Deflector, which invention is fully set forth in the following specification.

My invention has for its object to produce an efficient automobile light deflector of such a character that non-diffusing or non-refractive lenses may be used and yet wherein the light may be projected the maximum possible distance to efficiently light the road, light blinding being entirely avoided. By my invention, clear, transparent lenses or glasses may be used in front of the reflectors of the automobile head lights and consequently there is no loss of light by reason of diffusion of light, structures containing my invention being so formed as to cause all of the light to be reflected and directed to a field well in advance of the automobile.

The invention may be contained in structures which in their details may be varied. To illustrate the practical application of the invention, I have selected a light deflector containing my invention as an example of such structures and shall describe it hereinafter. The deflector selected for purposes of illustration is shown in the accompanying drawings.

Figure 1 illustrates a side view of the deflector as applied to a head-light on an automobile. Figure 2 is a front view. Figure 3 is a sectional view taken on a line 3—3 indicated in Figure 2. Figure 4 is a top view of one of the parts of the deflector.

As is well known, in most of the States, the use of transparent non-diffusing lenses in automobile head-lights are prohibited and as a result lenses for a certain refractive effect on the rays of light have become generally adopted, with the result that while some of the rays are spread over the road, yet by reason of the diffusive effect of such lenses, they are even more blinding than lenses having the plain glass that were in use before such laws went into effect, and also with the result that the light is not projected forward sufficiently far to produce a clear lighted field at a sufficient distance to permit proper fast driving at night. A considerable loss of light also follows such diffusion of light, which reduces the intensity of the light in the field. By my invention practically all of the light is used since it is practically all reflected towards the field that it is desired to light.

The deflector may be used in connection with any type of lamp. 1, in the drawings, indicates the reflector commonly used in automobile head-lights. A transparent non-diffusive lens or plate 2, is located in front of the reflector, as is, the plate or lens 2 secured in position by the ring 3, which may be provided with a bayonet joint or other connecting means for connecting the ring to the shell of the automobile lamp.

The deflector comprises a visor 4. The visor has a length slightly greater than the diameter of the opening of the ring and the tip of the visor is located substantially at the axis of the lamp. The base of the visor contacts with slightly more than the upper half of the rim. The side edges 5 extend horizontally, that is, at right angles to the plane of the ring 3. The major portion of the peak 6 of the visor, that is, the front edge, is substantially in a vertical plane. The corners 7 formed between the peak of the visor and the side edges 5, are rounded to produce an attractive appearance. The visor has a flange 8, that may be secured by the ring 3, when the ring 3 is placed in position to secure the lens 2. The visor is formed of a metal that may be easily polished. Preferably, it is nickel plated in order to improve its power of reflection.

The rays of light from the upper half of the lamp will all strike the reflecting surface of the visor 4 and be directed towards the road, the majority of such rays striking the reflected surface of the visor at a large angle of incidence will light the road at some little distance from the automobile. The rays of light from the lower half and the diverted or diffused rays of light that occur by reason of reflection and transmission of the light, will all be directed outward between the sides of the visor to light the road well in advance of the automobile, the length of the visor being such as to hood the light and prevent such rays of light from being directed to the eye of the operator of an approaching automobile, particularly, when the approaching automobile is within the danger point in passing.

In the use of the visor, rays that are reflected from the very narrow area extending from the bottom edge of the reflector 1 to its center, will reach the eye of the operator of an approaching automobile when the automobile is at some distance from the lamp. The area is very narrow at the edge of the reflector and gradually broadens as it approaches the center of the reflector. In order to prevent this light from reaching the point of the operator of the approaching automobile, I have provided a second light deflecting means 9, that intercepts the rays of light that come from this portion of the reflector 1. The part 9 is comparatively a long narrow strip in the the form of a segment having edges separated by a very small angle. The upper edge 10 is secured in the edge 6 of the visor and the lower end terminates in an ear or a very small depending flange 11, that may be secured in position by the ring 3. The part 9 is cylindrical in form, the upper side being convex and conforming substantially to a cylinder that would fit the edge or peak 6 of the visor 4, when located at the angle that the part 9 is located relative to the plane of the edge. The upper surface being convex and sloping upward from the lower edge of the reflector 1 to the axis of the reflector and to the outer end of the visor causes the rays of light coming from the narrow area of the reflector extending from the end of the part 9 to the center of the reflector, to be reflected to the right or to the left and so as to strike the inside of the visor, from which such rays are reflected towards the road by the visor, so that practically there is no light produced by the lamp but what is utilized in lighting the road.

I thus have provided an exceedingly efficient light deflector that will prevent all light from rising above a certain level within a long distance from the automobile and yet one wherein practically all of the light is utilized.

I claim:

1. In an automobile light deflector, a visor extending from the automobile lamp and a means for deflecting the light to the inner surface of the visor and extending from the bottom of the lamp diagonally upward to the peak of the visor.

2. In an automobile light deflector, a visor extending from the automobile lamp, and a cylindrical V shaped reflector having a convex upper surface and extending from the bottom of the lamp diagonally upwards to the visor.

3. In an automobile lamp deflector, a visor surrounding the upper half of the lens and extending forward to the axis of the lamp reflector, the forward edge of the visor being in substantially a vertical plane when the axis of the lamp reflector is in a horizontal plane, and a cylindrical V shaped reflector having an upper convex surface and extending from the bottom of the lamp diagonally upward to the peak of the visor.

In witness whereof I have hereunto signed my name to this specification.

CLARK V. McCARLEY.